United States Patent

Lingg et al.

[15] 3,704,773

[45] Dec. 5, 1972

[54] AIRPORT CHECK-IN COUNTER WITH BAGGAGE RECEIVING AND HANDLING FACILITY

[72] Inventors: Gerhard Lingg, Leimen; Eberhard Hellermann, Morfelden, both of Germany

[73] Assignee: Mannesmann-Geisel GmbH. & Co., Mannheim, Germany

[22] Filed: Aug. 30, 1971

[21] Appl. No.: 176,070

[30] Foreign Application Priority Data

Feb. 26, 1971   Germany.....................P 21 10 132.6

[52] U.S. Cl..................198/1, 186/1 A, 198/33 AC, 198/39, 198/89
[51] Int. Cl...............................................B65j 47/26
[58] Field of Search...............198/111, 33 AC, 102, 1

[56] References Cited

UNITED STATES PATENTS 3,666,073    5/1972    Lingg et al........................198/33 AC

*Primary Examiner*—Evon C. Blunk
*Assistant Examiner*—John Nitzke
*Attorney*—Ralph H. Seigemund and Smyth, Roston & Pavitt

[57] ABSTRACT

A twin check-in counter having two counter desks and baggage receiving areas next to the counter desks and next to each other, there being a pallet conveyor facility behind the counter to be shared by the two counters; in each receiving area begins a flight of conveyor belt for moving baggage towards the pallets; two belts are disposed behind the two flights of conveyor belts for tilting luggage on its side, they are laterally displaceable, to align either of them with the pallet conveyor facility.

5 Claims, 2 Drawing Figures

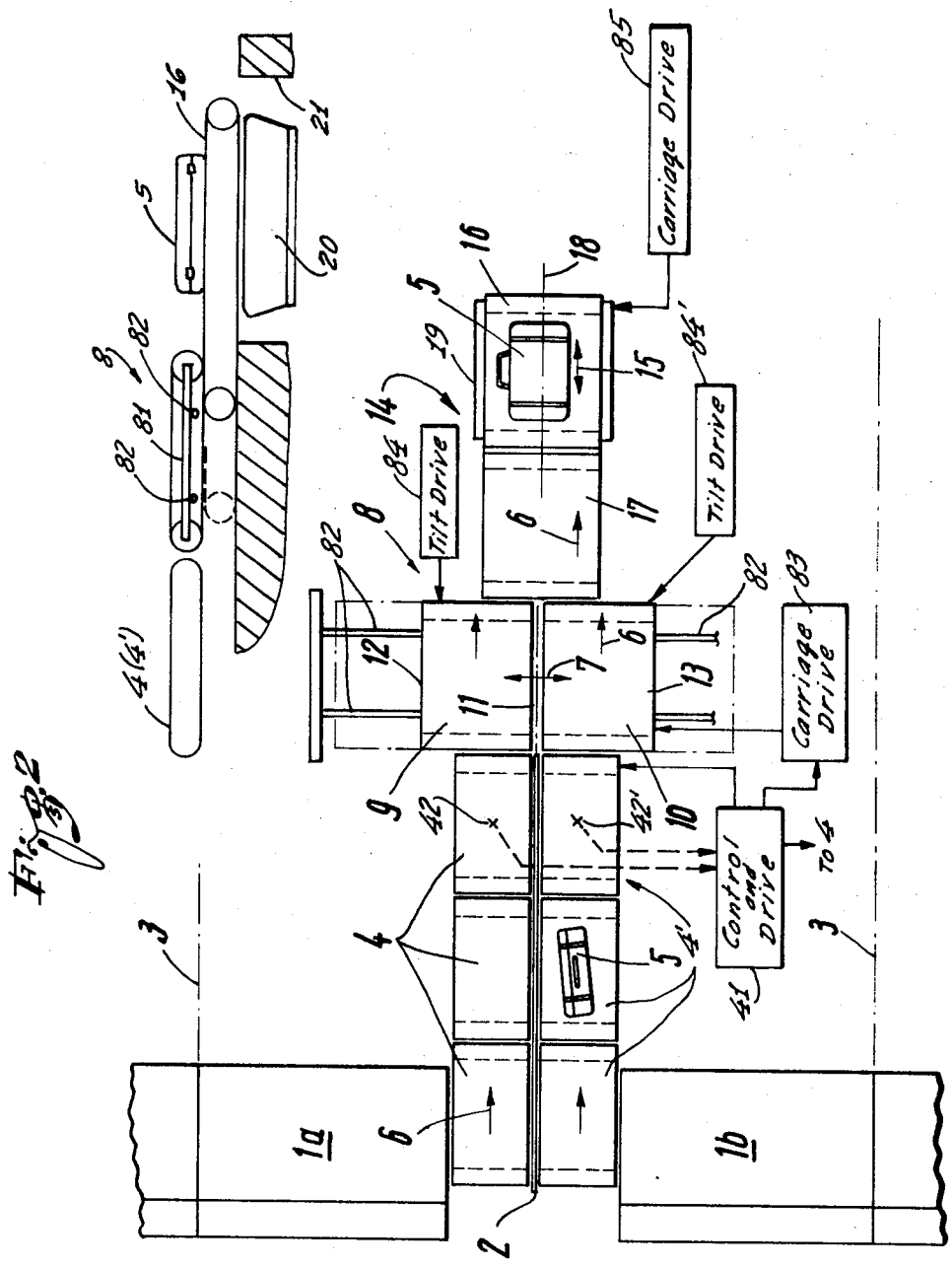

AIRPORT CHECK-IN COUNTER WITH BAGGAGE RECEIVING AND HANDLING FACILITY

The present invention relates to improvements for baggage check-in and handling facilities in airport check-in counters. More particularly, the invention relates to improvements in such facilities as set forth in our copending application for patent, Ser. No. 116,832, filed on Feb. 19, 1971. The disclosure of this copending application is incorporated by reference in this application. The check-in counters, as described therein, are arranged, e.g., in a row, and conveyor facilities are arranged for transporting baggage in direction transverse to the direction of extension of the row of counters, towards the rear of the counter front. A conveyor facility as associated with an individual counter is to include a first conveyor belt for immediate placement of baggage by a passenger who checks in. At least one other belt is disposed behind the first one, whereby the first and preferably one other belt are constructed to serve also as weighing scale; together they transport the luggage towards the rear. A luggage tilting assembly is disposed behind the last one of this flight of belts for laying down any upright standing suitcases, and loading means are provided to load the suitcases onto the pallets of a high speed conveyor facility.

In the preferred embodiment as disclosed in our copending application, pairs of such check-in counters are provided in mirror image configuration so that their respective baggage handling facilities share the pallet loading equipment, but luggage tilting assembly is provided separately for each counter. A laterally displaceable, orienting belt guides tilted suitcases from one or the other tilting assembly to a pallet to be loaded.

In accordance with the preferred embodiment of the present invention, the luggage tilting assembly is shared by two counters and is laterally displaceable so that the luggage from either flight of belts can be brought to the pallet loading facility, that is disposed in line with the center line of symmetry as between the two counters.

The arrangement in accordance with the invention obviates the need for a separate, laterally displaceable orienting belt, as the tilting assembly serves also as facility for guiding the luggage from the original path of transport to the laterally displaced entrance path of the pallet loading facility. Preferably, the tilting assembly is comprised of two, parallel running, endless conveyor belts, disposed side by side and tiltable about an axis in between, the axis being parallel to the direction of transport of either belt.

In furtherance of the invention, the laterally displaceable tilting assembly may constitute also a component of the pallet loading facility, in which case a pallet loading belt can be telescoped underneath the tilting assembly.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a top view of an example of the preferred embodiment of the present invention, similar in many respects to the embodiment as shown in FIGS. 1 to 3 of the copending application, except for the improvement that constitutes the invention of the present application; and FIG. 2 is a side view of a modified example of the preferred embodiment of the present invention, and being analogous to FIG. 2 of the copending application in many respects.

Proceeding now to the detailed description of the drawings, 1a and 1b are two counter desks of a plurality of desks arranged, e.g., along one side in an airport terminal building. The two desks pertain to a twin check-in counter, and the gap between the two desks is the baggage receiving area. Lines 3—3 denote the laterally outer boundaries of the twin counter, having a line of symmetry in which is disposed a partitioning 2.

As to each half of the twin counter, there is a flight of conveyor belts having three such endless belts, all of them may be constructed as weighing scales. The three belts 4 pertain to desk 1a on one side of partitioning 2, and this flight begins in the baggage receiving area next to desk 1a. Belts 4' on the other side of the partitioning pertain to desk 1b analogously. Each of the belts is individually driven subject to stop and go control by the respective clerk. Thus far, the assembly is similar, actually identical to the corresponding facilities as described in the copending application. Arrows 6 denote generally the direction of desired luggage transport that is away from and towards the rear of the row of counters.

The two counters of this twin counter share a luggage tilting assembly 8. The assembly 8 includes a carriage 81 running on rails 82 in direction of double arrow 7, transverse to transport direction 6. The carriage 81 is driven by a drive 83 providing lateral displacement of the tilting assembly essentially in between three different operating positions to be described below. The dash dot lines denote the displacement range.

The tilting assembly is comprised of two endless conveyor belts 9 and 10 disposed side by side, and the carriage or portion thereof may be tiltable on axis 11 between these two belts. In other words, the carriage has two hinged portions for the two belts 9 and 10, and these two portions are hinged on axis 11. A symbolically denoted tilt drive 84 may lift one side of belt 9, a tilt drive 84', oppositely placed, may lift one side of belt 10, so that either and both can pivot on axis 11. Thus, the upper sides of belts 9 and 10 are normally coplanar, at least approximately so, when the belts are folded back; on tilting both of them up, e.g. by about 45°, a through results of V-shaped inner profile with an angle of about 90° with a low point in axis 11.

A suitcase that stands upright on one of the belts 9 and 10 will be laid sideways on the other belt, upon operation of the tilt drives, and as the two belts axes folded back, the suitcase will lie on this other belt. The two belts 9 and 10 move their upper surface in direction of arrow 6, so that any load thereof is transported towards a pallet loading facility 14 to be described next. The belt motion is, of course, at right angles to the carriage motion, and the tilt lifting is transverse to both these directions.

The pallet loading facility is comprised of a feeder belt 17 disposed in alignment with the partitioning wall 2 and with the axis 18 of symmetry of the twin counter. The load bearing, upper surface of belt 17 is at least approximately coplanar with belts 9 and 10 when folded back. A pallet loading belt 16 is provided behind belt 17 but at a lower level to permit telescoping underneath belt 17. For this, belt 16 is disposed on a carriage 19 and can reciprocate as indicated by double arrow 15. In the illustrated position, belt 16 is protracted and covers a shaft in which pallets move up and down (see shaft 21 and pallets 20 in FIG. 2). In the retracted position belt 16 is at least partially underneath belt 17 to render the pallet in the shaft accessible from above.

Every suitcase is first placed on the first one of a flight of weighing belts, 4 or 4'. The individual belts of the respective flight may be controlled individually by the clerk standing behind the respectively associated counter desk, as check-in progresses. Normally, the tilting assembly 8 has the illustrated position so that belt 9 is aligned with the flight of belts 4, while belt 10 is aligned with the flight of belts 4'.

Reference numerals 42 and 42' denote schematically weight sense points of the respective last belt of the two flights, and a control facility 41 makes sure that only one flight can load tilting assembly 8. It should be noted here that normally the two flights are operated independently by the two clerks behind the two desks 1a and 1b as passenger check-in at each of the two counters proceeds independently from the other one. However, the tilting device can serve only one counter at the time. Therefor, independent from operation by the two clerks behind counters 1a and 1b, only one of the flights can move at a time if the respective last belt of both flights is loaded. This does not introduce any significant delay, as the tilting device serves each counter normally for only a short period, i.e., as to each counter, the duty factor for the tilting device is less than 50 percent, the two flights are quite frequently both halted.

A suitcase that has been moved by one of the flights of belts will now be shifted on one of the tilting belts 9 or 10, as the case may be, whereupon they both tilt up and fold back again, so that thereafter the suitcase will lie flat on one of the belts. It should be noted here that the location of the suitcases thereafter may not only depend on which of the flights fed the suitcase to the tilting assembly, but also whether the suitcase was placed on the first belt of the flight lying down or in standing position. Assuming that as a rule suitcases are placed in standing position (for example, because the belts are quite narrow and because the space between a desk and the partitioning does not permit any other placement), then the tilting device will always lay a suitcase down on the respective other belt. Thus, a suitcase arriving on belt 9 from flight 4 will, after folding, lie on belt 10. A suitcase, arriving from flight 4', will be laid onto belt 9.

The belts 9 and 10 may have stopped in the meantime (which is not necessary in principle; if these belts are sufficiently long, they may run continuously during their tilting operation). After completion of tilting, the carriage drive 83 is actuated. The direction of movement for the carriage may be made dependent upon which of the two flights fed the suitcase onto tilting device 8. The carriage drive 83 may thus be under control of circuitry included in device 41. The belt (9 or 10) that now carries the suitcase lying down, is brought into alignment with belt 17. The belt moves the suitcase in direction 6 and carriage 81 displaces the suitcase on the belt laterally (arrow 7) to align it with the center line 18 of the twin counter.

Belt 9 or 10 moves the suitcase onto belt 17, while belt 16 is underneath belt 17, but now both move in unison, while belt 16 on carriage 19 moves forward at the same speed as a whole, by operation of carriage drive 85. That part of operation is similar to the pallet loading operation described in the copending application. After the suitcase has been placed onto belt 16, the belt itself continues to run in direction of arrow 6 as far as its upper portion is concerned, but drive 85 retracts carriage 19 at similar speed so that the suitcase itself remains stationary, and drops onto the pallet underneath. That drop is not far, just about the height of endless belt 16 plus the depth of the pallet. The tilting device has returned in the meantime to a position of alignment of belts 9, 10, respectively, with flights 4, 4'.

As shown in FIG. 2, the feeder belt 17 for the pallet loading belt 16 can be eliminated, and belt 16 may be shifted directly underneath the tilting device 8, i.e., underneath belts 9 and 10 thereof. Actually, the belt 17 may be needed only to span the distance between the row of counter desks and the pallet shaft 21. Also, belt 17 may serve as temporary buffer storage, as pallets, such as 20, may not necessarily be available always when tilting device 8 is ready for unloading.

The invention is not limited to the embodiments described above but all changes and modifications thereof not constituting departures from the spirit and scope of the invention are intended to be included.

We claim:

1. In a check-in counter having a counter desk and a baggage receiving area next to the counter desk and having a front, there being a pallet conveyor facility behind the counter; a flight of conveyor belts disposed in the receiving area and having conveyor surfaces moving transverse to the front for moving objects in the transverse direction, away from the front towards the pallet conveyor facility, at least one of the conveyor belts of the flight constructed as weighing scale, the improvement comprising:
    first means disposed behind the flight of conveyor belts for tilting an object as received from the flight of belts on its side and transporting the object further;
    second means connected to the first means for laterally displacing the first means into alignment with the pallet conveyor facility; and
    third means disposed to receive the object from the first means for loading pallets of the pallet conveyor facility.

2. The combination as in claim 1, the third means comprising a conveyor belt, mounted for moving between a position under the first means and a position above a shaft, there being pallets for loading in the shaft.

3. The combination as in claim 1, there being a second flight of conveyor belts provided parallel to the first one, the third means for pallet loading disposed for servicing both of the flights, the first means displaceable in between positions of alignment with the two flights and with the third means.

4. The combination as in claim 3, the first means comprising a third conveyor belt behind, and normally in alignment with the first flight of belts, and a fourth conveyor belt next to and running parallel with the third belt, and in alignment with the second flight of belts, the third and fourth belts being tiltable about an axis parallel to and between the third and fourth belts, the second means operating to place the third or the fourth belt in alignment with the third means.

5. The combination as in claim 1, there being a second counter desk and second baggage receiving area in mirror image disposition to the first counter desk and baggage receiving area, there being additional conveyor means disposed in the second baggage receiving area, the first means disposed for alternatingly tilting objects from the first and second baggage receiving area and servicing the same pallet conveyor facility, by operation of the second means.

* * * * *